(12) United States Patent
Jo et al.

(10) Patent No.: US 7,872,727 B2
(45) Date of Patent: Jan. 18, 2011

(54) LIQUID CRYSTAL DISPLAY PANEL TRANSFERRING APPARATUS HAVING A MAIN BODY WITH AN AREA CORRESPONDING TO A LCD PANEL THAT FIXES AND THEN CUTS THE PANEL FROM A PROCESSED SUBSTRATE BY A PLURAL PIN IMPACT APPLYING UNIT FOR THEN TRANSFERRING

(75) Inventors: Kil-Hyun Jo, Daejeon (KR); Hyung-Jin Park, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/458,375

(22) Filed: Jul. 9, 2009

(65) Prior Publication Data

US 2009/0275258 A1    Nov. 5, 2009

Related U.S. Application Data

(62) Division of application No. 11/316,873, filed on Dec. 27, 2005, now Pat. No. 7,626,676.

(30) Foreign Application Priority Data

Jun. 20, 2005 (KR) ...................... 10-2005-0053200

(51) Int. Cl.
*G02F 1/1333* (2006.01)
(52) U.S. Cl. ...................................... 349/158; 349/187

(58) Field of Classification Search ................ 349/158, 349/187, 192; 438/401
See application file for complete search history.

(56) References Cited

U.S. PATENT DOCUMENTS

| | | | |
|---|---|---|---|
| 6,628,365 B1 * | 9/2003 | Park et al. | 349/153 |
| 2001/0053648 A1 * | 12/2001 | Furukawa et al. | 445/24 |
| 2003/0223030 A1 | 12/2003 | Byun et al. | |
| 2004/0001177 A1 * | 1/2004 | Byun et al. | 349/187 |

FOREIGN PATENT DOCUMENTS

| | | |
|---|---|---|
| KR | 10-2003-0075228 | 9/2003 |
| KR | 10-2005-0013320 | 2/2005 |

\* cited by examiner

*Primary Examiner*—John Heyman
(74) *Attorney, Agent, or Firm*—McKenna Long & Aldridge LLP

(57) ABSTRACT

A liquid crystal display (LCD) panel transferring system including a panel transferring apparatus that takes out and transfers a LCD panel formed at a surface of a substrate; a camera installed at the panel transferring apparatus that captures an image of the LCD panel; and a controlling unit that aligns the LCD panel with the panel transferring apparatus based on an image captured using the camera. The panel transferring apparatus includes a main body; a plurality of suction holes formed at the main body that fix an LCD panel to the main body; and a pin formed at the peripheral area of the main body that applies an impact to a dummy region to separate the LCD panel from the substrate.

10 Claims, 7 Drawing Sheets

LIQUID CRYSTAL DISPLAY PANEL TRANSFERRING APPARATUS HAVING A MAIN BODY WITH AN AREA CORRESPONDING TO A LCD PANEL THAT FIXES AND THEN CUTS THE PANEL FROM A PROCESSED SUBSTRATE BY A PLURAL PIN IMPACT APPLYING UNIT FOR THEN TRANSFERRING

CROSS-REFERENCE TO RELATED APPLICATIONS

This application is a Divisional of application Ser. No. 11/316,873 filed Dec. 27, 2005, now U.S. Pat. No. 7,626,676 now allowed; which claims priority to Korean Patent Application No. 10-2005-0053200, filed Jun. 20, 2005 all of which are hereby incorporated by reference for all purposes as if fully set forth herein.

This application claims the benefit of Korean Patent Application No. 10-2005-0053200, filed on Jun. 20, 2005, which is hereby incorporated by reference for all purposes as if fully set forth herein.

BACKGROUND OF THE INVENTION

1. Field of the Invention

The present invention relates to a liquid crystal display (LCD) panel transferring system and a method thereof, and particularly, to a liquid crystal display panel system and a method thereof capable of preventing fabrication of a defective LCD panel when separating and taking out a LCD panel from a substrate by accurately aligning the LCD panel in a panel transferring apparatus using a camera installed at the panel transferring apparatus for recognizing an alignment mark.

2. Discussion of the Related Art

Generally, a liquid crystal display (LCD) device provides liquid crystal cells arranged in a matrix form with corresponding data signals according to image information in order to display a desired image by controlling light-transmittance of each liquid crystal cell.

Accordingly, the LCD device includes a LCD panel where the liquid crystal cells are arranged in a matrix form and a driver integrated circuit (IC) for driving the liquid crystal cells of the LCD panel.

The LCD panel includes a color filter substrate and a thin film transistor array substrate wherein the color filter substrate and the transistor array substrate face each other and a liquid crystal layer formed therebetween.

On the thin film transistor array substrate of the LCD panel a plurality of data lines transmitting data signals supplied from the data driver integrated circuit to the liquid crystal cells are arranged. A plurality of gate lines for transmitting scan signals supplied from a gate driver integrated circuit to the liquid crystal cells are arranged perpendicular to the data lines on the thin film transistor array substrate. The liquid crystal cells are arranged at intersections of the data lines and the gate lines.

The gate driver integrated circuit supplies the scan signals to the plurality of gate lines sequentially so that the liquid crystal cells arranged in a matrix form can be sequentially selected one line by one line. The data signals are supplied to the liquid crystal cells of each sequentially selected line from the data driver integrated circuit through the plurality of data lines.

A common electrode and a pixel electrode are respectively formed at the inner sides of the color filter substrate and the thin film transistor array substrate, thereby applying an electric field to the liquid crystal layer. Whereas the pixel electrode is formed correspondingly to each liquid crystal cell on the thin film transistor array substrate, the common electrode is formed integrally on an entire surface of the color filter substrate. Accordingly, light-transmittance of the liquid crystal cells may be separately controlled by controlling a first voltage applied to the pixel electrode while applying a second voltage to the common electrode.

A thin film transistor is formed at the respective liquid crystal cells for use as a switching device for controlling the voltage applied to the pixel electrode formed on each liquid crystal cell.

A plurality of thin film transistor array substrates are formed on a large mother substrate and a plurality of color filter substrates are formed on another mother substrate. The two mother substrates then are bonded, so that a plurality of LCD panels are formed at the same time to improve yield. A process for cutting the bonded substrates into unit LCD panels is then required.

Generally, the cutting process to produce unit LCD panels includes using a diamond wheel to form a scribing line at a surface of the mother substrate, the diamond wheel having hardness greater than that of glass, and breaking the mother substrate at the scribing line by applying a mechanical force thereto. Hereinafter, a LCD panel will be explained with reference to the FIGS. 1, 2, and 3.

Figure 1:
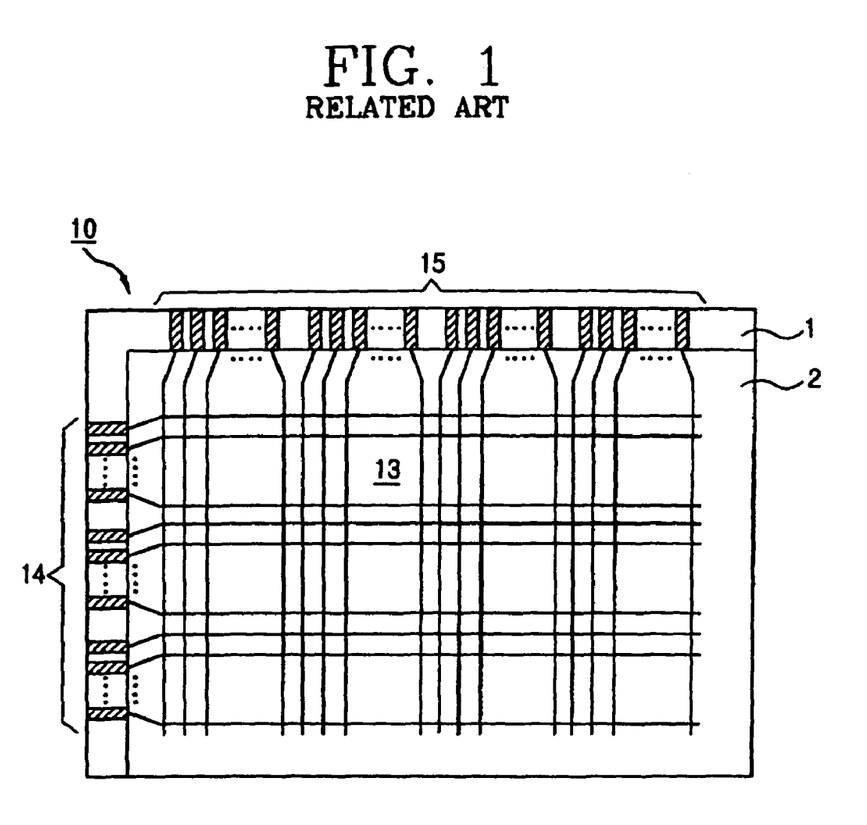
FIG. 1 is a plan view illustrating an exemplary structure of a liquid crystal display panel of the related art.

FIG. 1 is a view showing a schematic planar structure of an exemplary unit LCD panel prepared by bonding a thin film transistor array substrate to a color filter substrate.

Referring to FIG. 1, the unit LCD panel 10 includes: an image display unit 13 having liquid crystal cells arranged in a matrix form; a gate pad unit 14 connected to gate lines of the image display unit 13; and a data pad unit 15 connected to data lines. The gate pad unit 14 and the data pad unit 15 are formed on edge areas of a thin film transistor array substrate 1 that do not overlap the color filter substrate 2. The gate pad unit 14 supplies each of the gate lines of the image display unit 13 with a corresponding scan signal supplied from a gate driver integrated circuit, and the data pad unit 15 provides the data lines with image information supplied from a data driver integrated circuit.

On the thin film transistor array substrate 1 of the image display unit 13, the data lines having the image information applied thereto are arranged to cross substantially perpendicularly the gate lines having the scan signals applied thereto. Thin film transistors are formed at each intersection of the scan and data lines to switch the liquid crystal cells. Pixel electrodes are connected to the thin film transistors to drive the liquid crystal cells. A passivation layer is formed over the entire surface to protect the electrodes and the thin film transistors.

Also, color filters separated by a black matrix for each cell area are formed on the color filter substrate 2 of the pixel display unit 13. A transparent common electrode is formed on the thin film transistor array substrate 1.

A cell gap is provided between the thin film transistor array substrate 1 and the color filter substrate 2, that are bonded to each other by sealant (not shown) formed at the peripheral regions of the image display unit 13. The cell gap maintains a space between the thin film transistor array substrate 1 and the color filter substrate 2. A liquid crystal layer (not shown) is formed in the space between the thin film transistor array substrate 1 and the color filter substrate 2.

Figure 2:
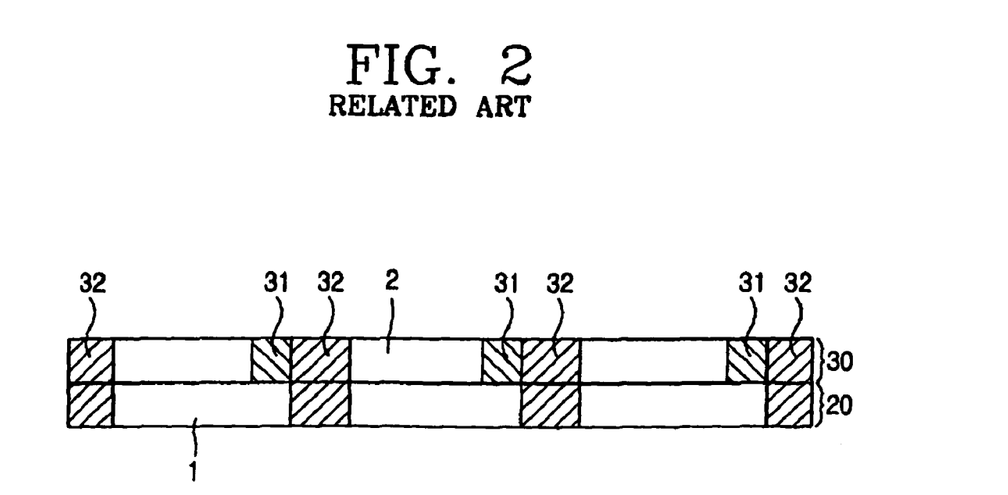
FIG. 2 is a cross-sectional view illustrating an exemplary substrate including a plurality of liquid crystal display panels.

FIG. 2 is a view showing an exemplary cross-sectional structure of a first mother substrate having thin film transistor array substrates 1 and a second mother substrate having color filter substrates 2, wherein the first and second mother substrates are bonded to each other to form a plurality of LCD panels.

Referring to FIG. 2, each unit LCD panel has the thin film transistor array substrate 1 longer than the color filter substrate 2. This is because the gate pad unit 14 and the data pad unit 15 are formed, as illustrated in FIG. 1, at the edges of the thin film transistor array substrate 1 that does not overlap the color filter substrate 2.

Hence, the second mother substrate 30 and the color filter substrates 2 formed thereon are spaced apart from each other by a dummy region 31 corresponding to the protruding area of each thin film transistor array substrate 1 on the first mother substrate 20.

Moreover, the unit LCD panels are arranged so as to maximize the use of the first and second mother substrates 20 and 30. Although it depends on models, the unit LCD panels are generally spaced apart from each other at a distance corresponding to the area of the other dummy region 32.

After the first mother substrate 20 having the thin film transistor array substrates 1 is bonded to the second mother substrate 30 having the color filter substrates 2, a scribing process and a breaking process are carried out to individually cut the LCD panels.

The scribing process is performed to form a scribing line using a cutting wheel, and the breaking process is performed to separate the substrates along the scribing line using a steam cutting device.

Figure 3:
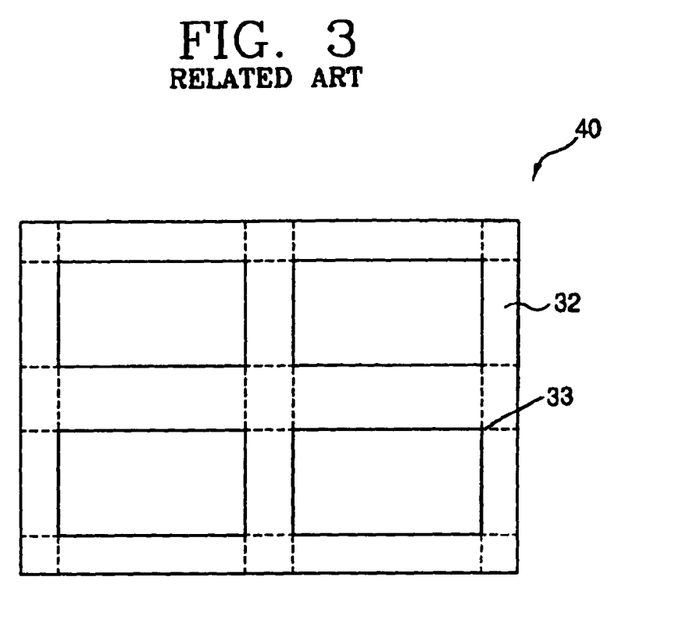
FIG. 3 is a plan view illustrating an exemplary substrate on which a scribing line is formed passing through a scribing process and a breaking process.

FIG. 3 illustrates a substrate 40 processed by the cutting wheel and the steam cutting device. As illustrated in FIG. 3, a scribing line 33 is formed on the substrate 40 including a plurality of LCD panels 10 using the cutting wheel, and the substrate 40 is completely cut along the scribing line 33 using the steam cutting device.

However, several problems may occur in the apparatus for cutting the substrate using the steam cutting device. In order to separate the LCD panel from the substrate after cutting by the steam cutting device, the cut dummy substrate must be lowered by gravity below the cut line. Accordingly, space must be provided below the cut line. Dust may be generated from the dummy substrate lowered below the cut line. In addition, if the substrate is not successfully cut using the steam cutting device, the uncut substrate is transferred to later processes, resulting in an interruption of the later processes.

SUMMARY OF THE INVENTION

Accordingly, the present invention is directed to the liquid crystal display panel transferring system and method thereof that substantially obviates one or more of the problems due to limitations and disadvantages of the related art.

An advantage of the present invention is to provide a liquid crystal display (LCD) panel transferring system and a transferring method thereof capable of completely separating a LCD panel from a substrate and simultaneously transferring the LCD panel to the next process using a pin to apply pressure to the substrate that has been partially cut by a cutting wheel and a steam cutting device.

Another advantage of the present invention is to provide a liquid crystal display (LCD) panel transferring system and a transferring method thereof in which an alignment mark is formed at a dummy region of a LCD panel and the alignment mark is captured using a camera to thus recognize the aligned state of the LCD panel, so as to apply an impact to the LCD panel when separating the LCD panel from a substrate, preventing the fabrication of a defective LCD panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display (LCD) panel transferring system including: a panel transferring apparatus that takes out and transfers a LCD panel formed on a substrate; a camera installed at the transferring apparatus to capture an image of the LCD panel; and a controlling unit that aligns the LCD panel with the panel transferring apparatus based on the image captured using the camera.

In another aspect of the present invention, a liquid crystal display (LCD) panel transferring method may include: preparing a substrate including a plurality of LCD panels and dummy regions; moving a panel transferring apparatus to the LCD panel; determining whether the LCD panel is aligned with the panel transferring apparatus; and transferring the LCD panel when the LCD panel is aligned with the panel transferring apparatus. The determining of alignment of the LCD panel may include: capturing an alignment mark formed at the dummy region of the LCD panel; generating coordinate data by processing the captured image; and comparing the generated coordinate data to the set coordinate data.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

The present invention is directed to a new method for cutting a substrate into unit panels, in which a new apparatus and method is proposed to cut the substrate. In particular, the present invention relates to an apparatus by which a liquid crystal display (LCD) panel can be cut and transferred. In this aspect, the cutting apparatus may be referred to as a transferring apparatus for transferring the cut LCD panel. The transferring apparatus does not independently cut the substrate. That is, the transferring apparatus cuts the substrate together with the cutting wheel and the steam cutting device. Substantially, the substrate is partially cut by the cutting wheel and the steam cutting device, but is not completely separated as a unit panel. The LCD panel is completely separated from the substrate and then transferred by the transferring apparatus.

Hereinafter, a transferring apparatus according to the present invention will now be explained in more detail with reference to the accompanying drawings.

Figure 4:
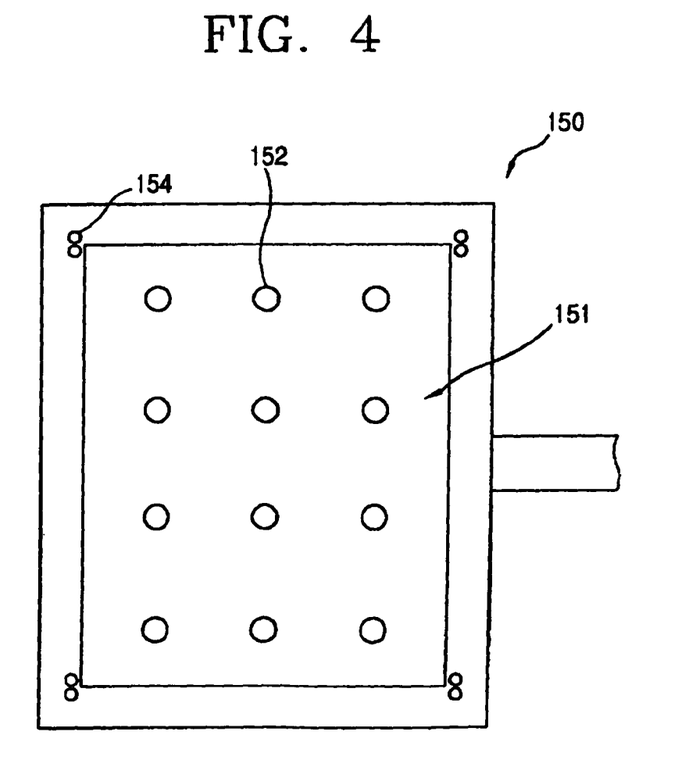
FIG. 4 is a view illustrating an exemplary structure of a liquid crystal display panel transferring apparatus according to an embodiment of the present invention.

FIG. 4 is a view illustrating a LCD panel transferring apparatus according to an embodiment of the present invention. As illustrated in FIG. 4, a transferring apparatus 150 may include a main body 151, a plurality of suction holes 152 formed at the main body 151, for applying suction to the LCD panel 110, and pins 154 formed at an edge of the main body 151. The transferring apparatus 150 is used to completely separate the LCD panel 110 from the substrate 140 and simultaneously transfer the separated LCD panel 110 to the next process. Here, the pins 154 press against the dummy region 132 to completely separate the LCD panel 110 from the substrate 140, and suction applied through the suction holes 152 holds the separated LCD panel 110 to the main body 151 for transfer to the next process.

Figure 5:
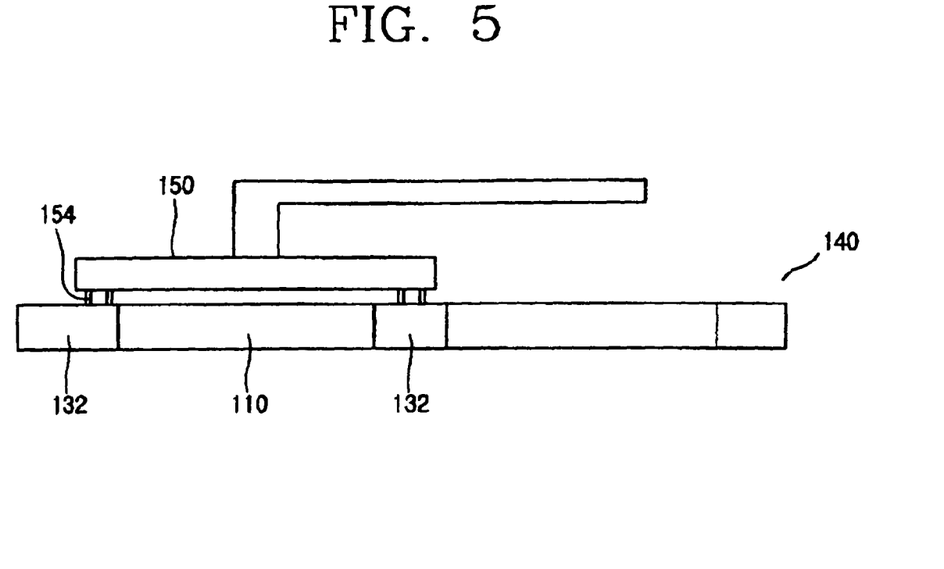
FIG. 5 is a view illustrating that a liquid crystal display panel is taken out from a substrate using a liquid crystal display panel transferring apparatus.

Referring to FIG. 5, when the substrate 140 having undergone the scribing process and the breaking process is transferred through a conveyer, the transferring apparatus 150 moves to a set position above the substrate 140 (i.e., a position where the LCD panel 110 is formed) and is then lowered. When the transferring apparatus 150 is lowered, the pins 154 move downwardly from the main body 151 to apply pressure to the dummy region 132 of the substrate 140, completely separating the LCD panel 110 from the substrate 140. The separated LCD panel 110 is fixed to the main body 151 by a suction applied through the suction holes 152 formed in the main body 151. The fixed LCD panel 110 is then transferred to the next process by a transferring unit such as a motor.

In summary, the substrate 140 is cut using the cutting wheel, the steam cutting device and the transferring apparatus completely separates the LCD panel 110 from the substrate 140. The transferring apparatus 150 used in cutting the substrate 140 is further used to transfer the LCD panel 110 to the next process. Accordingly, the separated LCD panel 110 is quickly transferred and a separate space for collecting the dummy substrate is not required. Also, even when the LCD panel 110 is not completely separated from the substrate 140 (i.e., even when the substrate is defectively cut), the cutting process can progress without stopping the cutting line itself.

Figure 6:
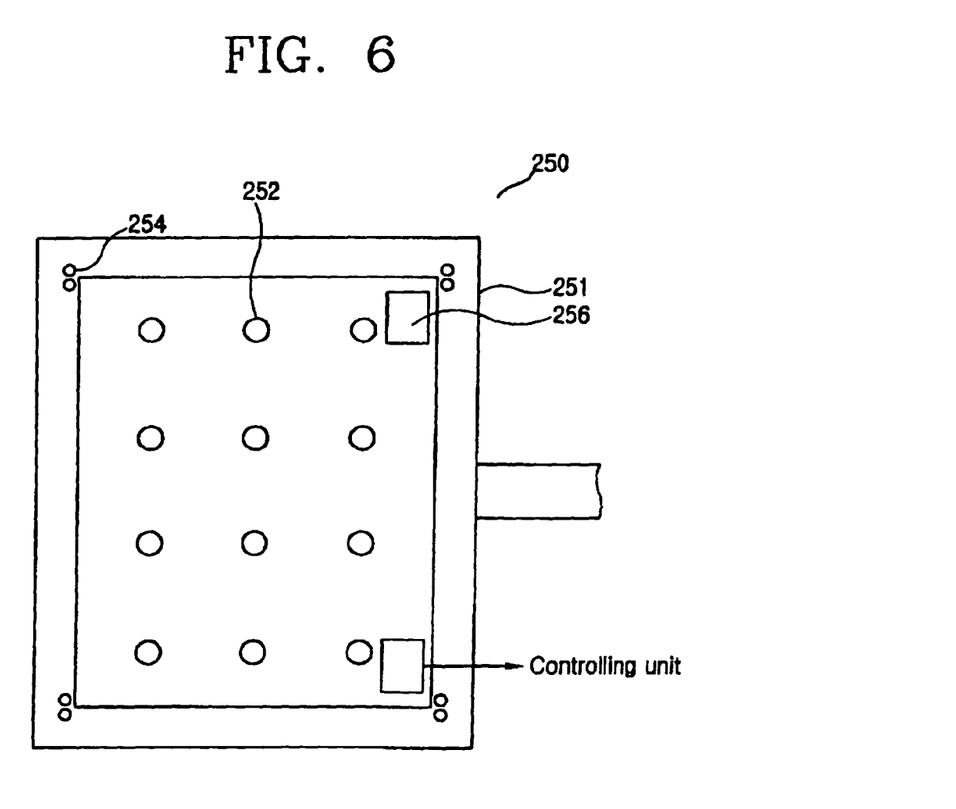
FIG. 6 is a view illustrating a structure of a liquid crystal display panel transferring system according to another embodiment of the present invention.

FIG. 6 is a view illustrating a LCD panel transferring apparatus 250 according to another embodiment of the present invention.

As illustrated in FIG. 6, the transferring apparatus 250 may include a main body 251 for fixing and transferring a LCD panel; a plurality of suction holes 252 formed at the main body 251 and connected to a vacuum device for applying suction to the LCD panel; pins 254 formed at an edge of the main body 251 and protruding outwardly from the main body 251 for applying an impact to the dummy region; and a camera 256 formed at the main body 251 for checking the alignment of the LCD panel.

A plurality of LCD panels are formed on a substrate with dummy regions formed between LCD panels and between the LCD panels and each side of the substrate. The transferring apparatus 250 removes an LCD panel from of the substrate after the scribing process and the breaking process for transfer to the next process. The pins 254 apply an impact to the dummy region when taking a LCD panel from the substrate, to completely separate the LCD panel from the substrate. Suction applied through the suction holes 252 fixes the LCD panel onto the main body 251 of the transferring apparatus 250 for transfer to the next process.

The camera 256 on the main body 251 is used for aligning the LCD panel 210 with the main body 251. When the LCD panel is not aligned with the main body 251 due to an external impact, the pins 254 do not apply pressure to the dummy region of the substrate but instead applies pressure to the LCD panel as will now be explained with reference to FIGS. 7A and 7B.

Figure 7A:
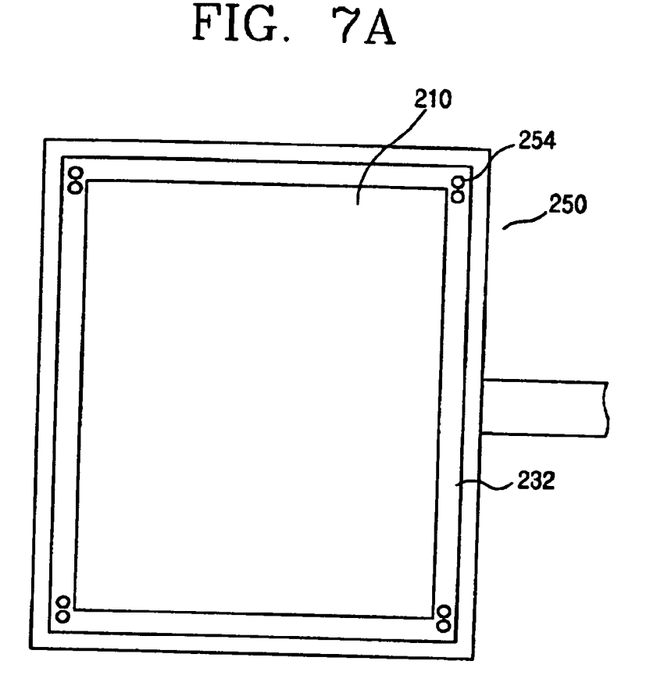
FIG. 7 is a view illustrating a state where a liquid crystal display panel is misaligned with a transferring apparatus.
Figure 7B:
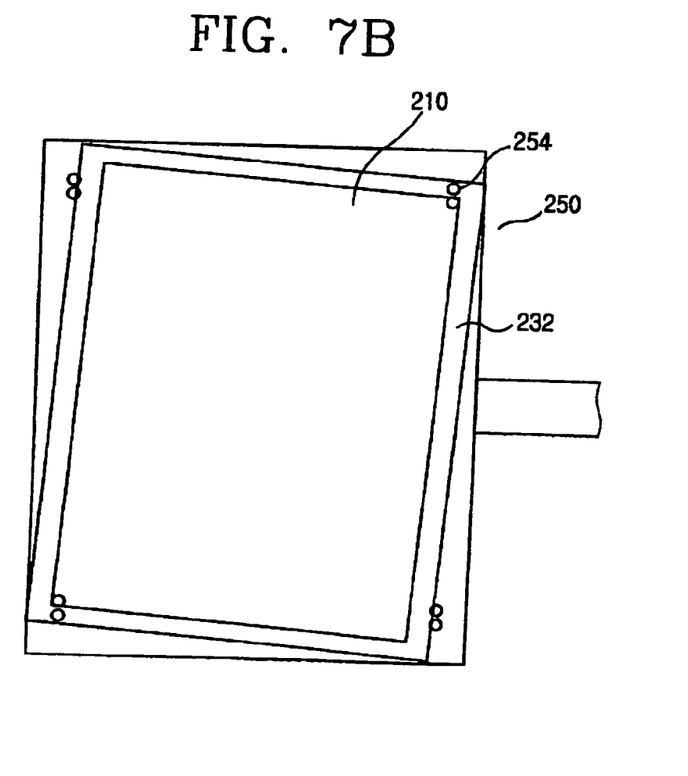

FIG. 7A is a view illustrating the substrate 210 as it normally moves in the conveyer, and FIG. 7B is a view illustrating the substrate 210 having a position deviating from the normal state by movement away from the conveyer due to an external impact such as from an outer force. The LCD panel 210 which has been separated and transferred from the substrate using the transferring apparatus 250 is not separated from the substrate completely, but the drawings illustrate only the LCD panel 210 and its dummy regions 232 for convenience of explanation.

Referring to FIG. 7A, when the LCD panel 210 is aligned with the main body 251, the pin 254 of the transferring apparatus 250 is positioned at the dummy region 232 of a peripheral area of the LCD panel 210 when transferring the LCD panel 210, and thus an impact from the pin 254 is applied to the dummy region 232 to separate the LCD panel 210 from the substrate without any defect.

However, as illustrated in FIG. 7B, when the LCD panel 210 deviates from its normal position, the pin 254 is positioned at the LCD panel 210 other than at the dummy region 232, or is positioned at an outer region of the LCD panel 210, and thus the pin 254 does not apply an impact to the LCD panel 210 or the substrate. As a result, upon separating the LCD panel 210 from the substrate, a defect may be generated such that a part of the LCD panel 210 may be plucked off, or a part of the dummy region 232 may not be removed from the LCD panel 210.

When the LCD panel 210 is misaligned with the main body 251, the misalignment of the LCD panel 210 may be determined using the camera 256.

Figure 8:
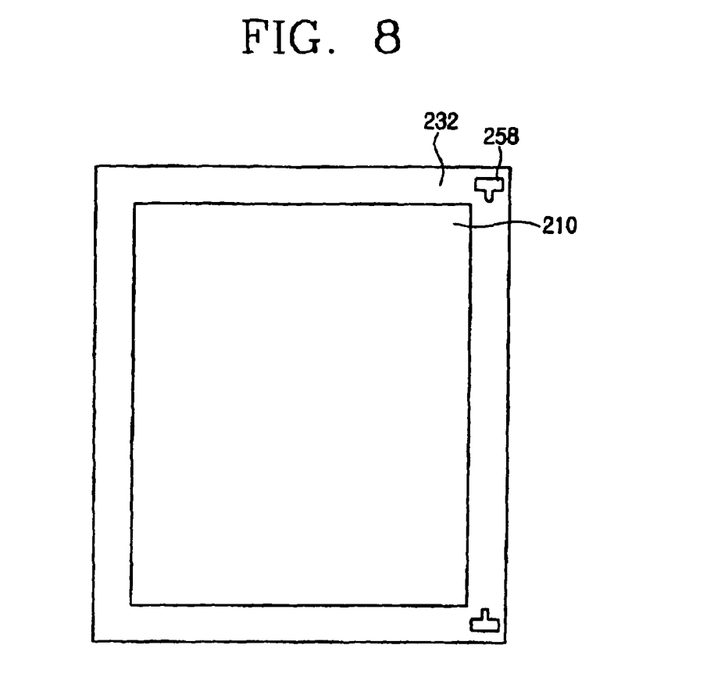
FIG. 8 is view illustrating a liquid crystal display panel having an alignment mark at a dummy region.

FIG. 8 is a view illustrating the LCD panel 210 being transferred by the transferring apparatus 250 of FIGS. 7A and 7B. While a plurality of LCD panels 210 are actually formed on the surface of the substrate, the drawing illustrates only a single LCD panel 210 fixed to the main body 251 of the transferring apparatus 250 and its dummy region 232 for convenience of explanation. Also, because of the differing sizes of lower and upper substrates of the LCD panel 210, a pad region of the lower substrate protrudes from partial areas of the LCD panel 210.

Referring to FIG. 8, an alignment mark 258 is formed at the dummy region 232 of the peripheral area of the LCD panel 210. The alignment mark 258 is of a type used in a typical photolithography process. Although two alignment marks are shown in the drawing, more than two alignment marks may be formed. The shape of the alignment mark 258 is not limited to a particular shape. The alignment mark 258 can be formed at any point on the LCD panel 210 that can be aligned with the transferring apparatus 250. That is, the alignment mark 258 may be formed at the LCD panel 210 as well as at the dummy region 232 (in this case, the alignment mark 258 is formed at an image non-display region where any image is not displayed). When formed at the dummy region 232, the alignment mark 258 may be formed at various points of the dummy region 232.

The camera 256 is a camera enabling an image processing such as a Charge Coupled Device (CCD) camera. The alignment mark 258 formed at the dummy region 232 of the peripheral area of the LCD panel 210 is captured with the camera 256. A plurality of cameras 256 may be provided. For example, the number cameras 256 may the same as the number of alignment marks so that each alignment mark is captured by a camera 256 corresponding thereto. An image of the alignment mark 258 captured using the camera 256 is sent to the controlling unit for determining whether the LCD panel 210 is aligned with the transferring apparatus 250.

The controlling unit determines whether the LCD panel 210 is aligned with the transferring apparatus 250 based on the image captured using the camera 256, and also drives the transferring apparatus 250 to automatically align the LCD panel 210 with the transferring apparatus 250 when the LCD panel 210 is misaligned with the transferring apparatus 250.

Figure 9:
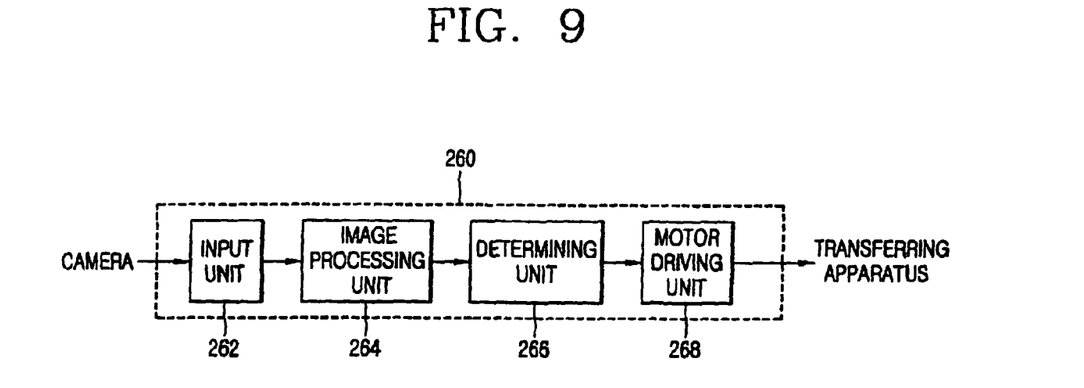
FIG. 9 is a block diagram illustrating a structure of a controlling unit of a transferring system according to the present invention.

As illustrated in FIG. 9, the controlling unit 260 may include: an input unit 262 into which the image of the alignment mark 258 captured using the camera 256 is input; an image processing unit 264 for performing data processing with respect to the image input from the input unit 262; a determining unit 266 for determining whether the LCD panel 210 is aligned with the transferring apparatus 250 based on the data processed in the image processing unit 264; and a motor driving unit 268 for driving a motor when the LCD panel 210 is misaligned with the transferring apparatus 250, to thus move the main body of the transferring apparatus 250, thereby aligning the LCD panel 210 with the transferring apparatus 250.

The image processing unit 264 processes an image to generate coordinate data of the captured alignment mark 258, and the determining unit 266 determines whether the LCD panel 210 is aligned with the transferring apparatus 250 based on the generated coordinate data. The procedure by which the controlling unit 260 aligns the LCD panel 210 with the transferring apparatus 250 is explained in more detail with reference to the flowchart illustrated in FIG. 10.

Figure 10:
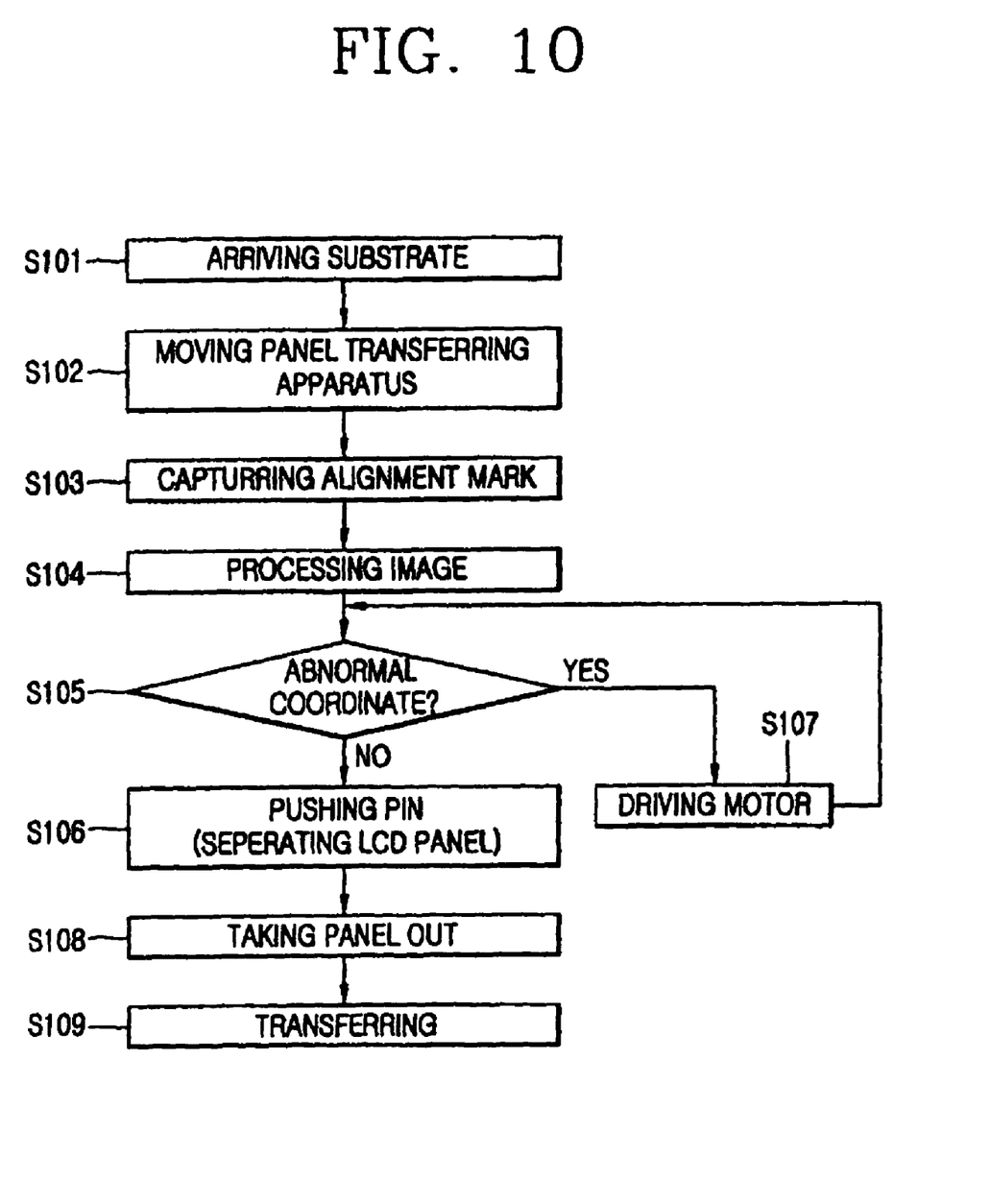
FIG. 10 is a flowchart illustrating a method for taking out a liquid crystal display panel from a substrate and transferring it using a transferring system according to the present invention.

First, when a substrate having a plurality of LCD panels 210 arrives after undergoing a scribing process and a breaking process, the panel transferring apparatus 250 moves above a LCD panel 210 formed at the surface of the substrate and then is lowered (S102). Thereafter, the camera 256 installed at the transferring apparatus 250 captures the alignment mark 258 formed at the dummy region of the substrate, and then sends information of the captured image to the controlling unit 260 (S103). The image processing unit 264 of the controlling unit 260 processes the input data to generate coordinate data of the alignment mark 258 (S104).

The coordinate data of the alignment mark 258 generated from the image processing unit 264 is compared to data set by the determining unit 266. That is, the image-processed coordinate data of the alignment mark 258 is compared to set coordinate data. If the image-processed coordinate data is the same as the set coordinate data or a deviation therebetween below a limiting value exists, the determining unit 266 determines that the substrate is sufficiently aligned (S105). In other words, the determining unit 266 determines that the pin 254 of the transferring apparatus 250 will contact the dummy region 232, and drives the pin 254 of the transferring apparatus 250 to apply an impact to the dummy region 232. The impact separates the LCD panel 210 from the substrate (S106), and the LCD panel 210 thereafter is taken out from the substrate using suction applied through the suction holes 252 (S108).

Figure 11:
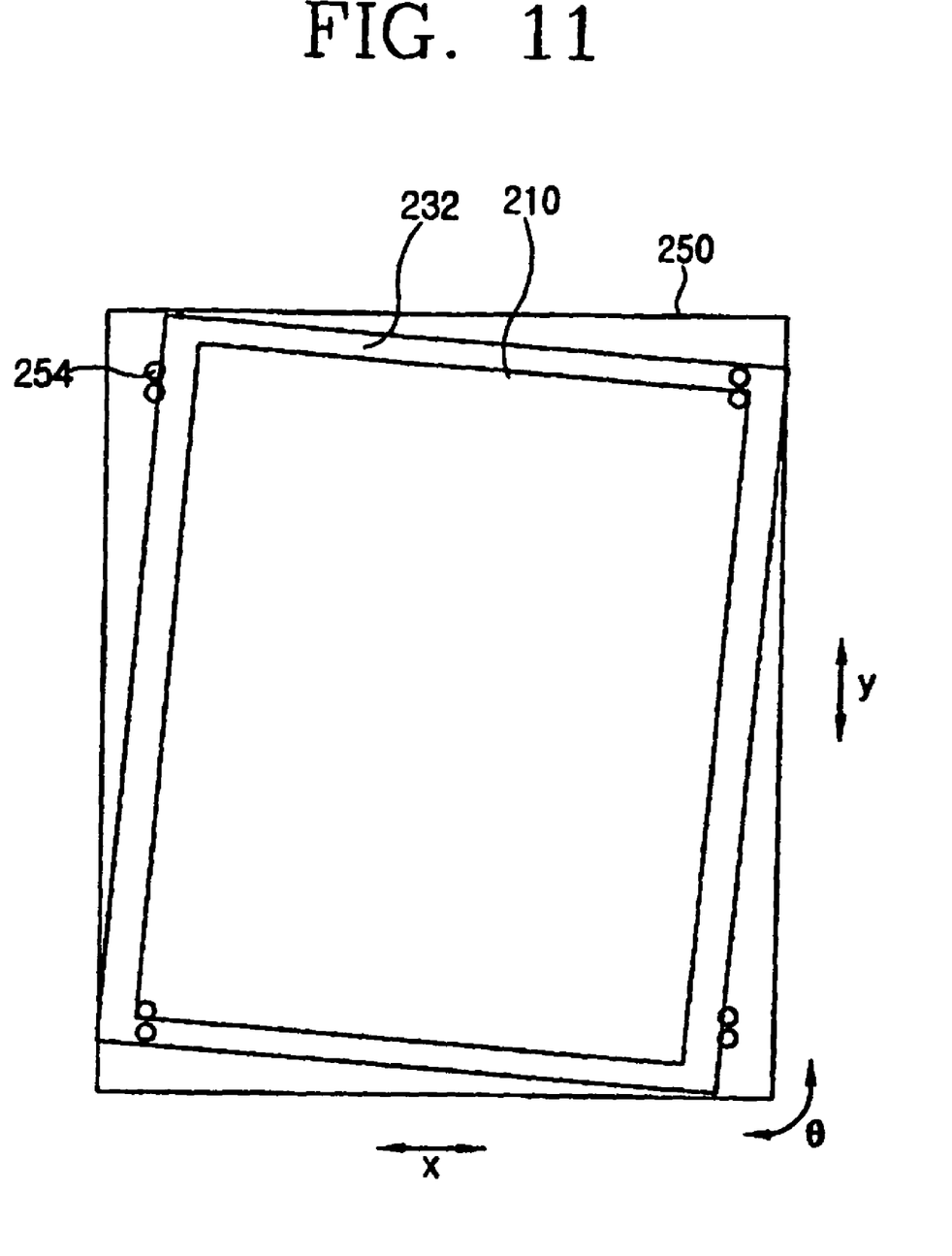
FIG. 11 is a view illustrating alignment of the liquid crystal display panel with a transferring apparatus by moving the transferring apparatus when the liquid crystal display panel is misaligned with the transferring apparatus.

If on the other hand, the comparison of the image-processed coordinate data of the alignment mark 258 to the set coordinate data indicates that a deviation therebetween of more than the limiting value exists, the determining unit 266 determines the LCD panel 210 to be misaligned and drives a motor using the motor driving unit 268, thereby moving the transferring apparatus 250 (S107). Upon determining that a misalignment exists, the transferring apparatus 250, as illustrated in FIG. 11, is moved along the x and y directions, and also rotated in θ-direction by the motor, allowing the transferring apparatus 250 to be positioned at a desired region. The moving of the transferring apparatus 250, namely, the coordinate compensation continues until the misalignment is determined to be below the limiting value by the determining unit 266. When coordinate compensation is complete the LCD panel 210 is separated from the substrate by an impact from the pin 254. The LCD panel 210 taken out from the substrate is fixed to the transferring apparatus 250 by the suction holes 252 to be transferred to the next process (S109).

When the comparison between the image-processed coordinate data of the alignment mark 258 and the set coordinate data indicates that a deviation therebetween of more than the limiting value exists, that is, if the LCD panel 210 is misaligned with the transferring apparatus 250, the controlling unit 260 may inform a user of the misalignment using a display unit such as a display or an alarm to display or announce misalignment information. Thus, the user is informed of the misalignment allowing the user to investigate the cause for the misalignment and to take action to address a recurring misalignment problem.

As described above, in the present invention, the camera is installed at the transferring apparatus of the LCD panel to thus detect whether the LCD panel is aligned with the transferring apparatus, and when the LCD panel is misaligned with the transferring apparatus, the transferring apparatus is driven to allow the LCD panel to be automatically aligned thereto. Therefore, it is possible to prevent defects that may be generated when the pin contacts an area other than the dummy region, namely, an area within the LCD panel.

As the present invention may be embodied in several forms without departing from the spirit thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) panel transferring apparatus having a main body comprising:
    the main body fixes a LCD panel formed at a substrate, the substrate including a plurality of LCD panels to be cut, an area of the main body substantially the same as that of the LCD panel;
    an impact applying unit comprising a plurality of pins protruding outwardly formed at a peripheral area of the main body, that applies an impact to a dummy region at an outer area of the LCD panel to be fixed to the main body; and
    a capturing unit at the main body that captures an image of the LCD panel to determine whether the LCD panel is aligned,
    wherein the cut LCD panel is separated from the substrate by ascending the main body from the substrate.

2. The apparatus of claim 1, further comprising a plurality of suction holes formed at the main body that fix the LCD panel to the main body.

3. The apparatus of claim 1, wherein the LCD panel is formed at a surface of a substrate that includes at least one LCD panel, and the substrate is processed by performing a scribing process and a breaking process.

4. The apparatus of claim 3, wherein a dummy region is formed at the peripheral area of the LCD panel.

5. The apparatus of claim 4, wherein an alignment mark is formed at the dummy region.

6. The apparatus of claim 5, wherein the capturing unit captures the alignment mark.

7. The apparatus of claim 1, wherein the capturing unit includes a camera.

8. The apparatus of claim 7, wherein the camera includes a Charge Coupled Device (CCD) camera.

9. A liquid crystal display (LCD) panel transferring apparatus having a main body comprising:
    the main body having an area corresponding to a LCD panel fixes the LCD panel included in a processed substrate;
    an impact applying unit comprising a plurality of pins formed at a peripheral area of the main body and protruding outwardly from the main body, that applies an impact to the substrate of an outer area of the LCD panel to be fixed to the main body to separate the LCD panel from the substrate; and
    a transferring unit for moving the main body to transfer the LCD panel that is separated from the substrate and fixed to the main body.

10. The apparatus of claim 9, including a plurality of holes in the main body for applying a suction to the LCD panel.

* * * * *